(12) United States Patent
Boecker et al.

(10) Patent No.: US 7,384,053 B1
(45) Date of Patent: Jun. 10, 2008

(54) SYSTEM FOR ROLLING ANGLE REDUCTION IN MOTOR VEHICLES

(75) Inventors: Martin Boecker, Korschenbroich (DE); Theo Heep, Krefeld (DE)

(73) Assignee: TRW Automotive GmbH (DE)

( * ) Notice: Subject to any disclaimer, the term of this patent is extended or adjusted under 35 U.S.C. 154(b) by 274 days.

(21) Appl. No.: 10/933,112

(22) Filed: Sep. 2, 2004

(30) Foreign Application Priority Data

Sep. 3, 2003 (DE) .......................... 203 13 665 U

(51) Int. Cl.
*B60G 21/055* (2006.01)
(52) U.S. Cl. .................. 280/124.152; 280/124.15; 280/124.106; 280/124.145; 280/124.154; 267/183
(58) Field of Classification Search ......... 280/124.107, 280/124.152, 124.137, 124.145, 124.146, 280/124.154, 124.151, 124.13, 124.106; 267/183
See application file for complete search history.

(56) References Cited

U.S. PATENT DOCUMENTS

| 1,687,527 | A | | 10/1928 | Thompson | |
|---|---|---|---|---|---|
| 4,484,767 | A | * | 11/1984 | Klem | 280/124.107 |
| 5,062,655 | A | * | 11/1991 | Sommerer | 280/124.138 |
| 5,062,656 | A | * | 11/1991 | Hynds et al. | 280/124.152 |
| 6,254,114 | B1 | * | 7/2001 | Pulling et al. | 280/93.511 |
| 6,478,319 | B1 | * | 11/2002 | Boedrich | 280/124.145 |
| 6,604,270 | B2 | * | 8/2003 | Kincaid et al. | 29/441.1 |
| 6,866,276 | B2 | * | 3/2005 | Carlstedt et al. | 280/124.107 |
| 2004/0140640 | A1 | * | 7/2004 | Frantzen et al. | 280/124.107 |
| 2004/0173985 | A1 | | 9/2004 | Bruhl et al. | |

FOREIGN PATENT DOCUMENTS

| DE | 601 137 | 8/1934 |
|---|---|---|
| DE | 1 655 430 | 7/1971 |
| DE | 30 27 694 | 2/1982 |
| DE | 37 36 130 | 8/1988 |
| DE | 299 15 964 | 2/2000 |
| DE | 101 34 715 | 2/2003 |
| GB | 2 306 412 | 5/1997 |

* cited by examiner

*Primary Examiner*—Ruth Ilan
*Assistant Examiner*—Drew J. Brown
(74) *Attorney, Agent, or Firm*—MacMillan, Sobanski & Todd, LLC

(57) ABSTRACT

A system for rolling angle reduction in a motor vehicle includes a stabilizer (10) and a piston/cylinder unit (12) coupled to one end of the stabilizer (10). The cylinder (14) of the piston/cylinder unit (12) is mounted in a hollow joint (24) so as to be swivellable in several directions.

7 Claims, 4 Drawing Sheets

SYSTEM FOR ROLLING ANGLE REDUCTION IN MOTOR VEHICLES

CROSS-REFERENCE TO RELATED APPLICATION

This application claims priority to German Application No. 203 13 665.9 filed Sep. 3, 2003, the disclosures of which are incorporated herein by reference.

BACKGROUND OF THE INVENTION

The invention relates to a system for rolling angle reduction in a motor vehicle.

Systems for the reduction of the rolling angle during the travel of a motor vehicle include arrangements using a stabilizer pendulum. In other arrangements a hydraulically operated piston/cylinder unit is used instead. The piston/cylinder unit enables an additional deflection of the stabilizer during cornering of the vehicle when transverse accelerations occur, so that the rolling angle is reduced. When driving straight forward, the stabilizer is uncoupled from the chassis, by venting the hydraulic cylinder of the piston/cylinder to a tank. This provides for an increase in comfort when driving over an obstacle on one lateral side of the vehicle.

The piston/cylinder unit is usually supported at its ends. When restrictions in space do not permit such a bearing, a fork bearing of the cylinder could be provided. However, as a fork bearing is only of use in so-called plane gears, but the coupling of the stabilizer to the chassis requires a so-called three-dimensional gear, this approach is ruled out. Due to the spring movement of the chassis, movements of the connection point of the fork parallel to the bearing axis and relative to the connection point of the stabilizer would occur. In addition, the transverse stresses, owing to the elastokinematic movements of the chassis relative to the vehicle body, are to be taken into account. The transverse movements lead to the introduction of moments and transverse forces into the hydraulic cylinder, which can result in increased wear of the piston ring and seal. At worst a jamming and failure of the cylinder occurs. Also, an elastic connection of the bearing axis could only partially compensate these relative movements.

Thus, there is a desire for a system for rolling angle reduction with a bearing of the piston/cylinder unit which is less susceptible to stresses occurring during travel.

SUMMARY OF THE INVENTION

The system for rolling angle reduction in a motor vehicle according to the invention comprises a stabilizer and a piston/cylinder unit coupled to one end of the stabilizer. The cylinder of the piston/cylinder unit is mounted in a hollow joint so as to be swivellable in several directions. Through the bearing with the additional degrees of freedom regarding the swivellability, the orientation of the piston/cylinder unit is adapted optimally to the respective travel situation. The solution according to the invention makes possible in particular a compensation of the transverse stresses, which provides for a greater service life of the piston/cylinder unit and its bearing.

Other advantages of this invention will become apparent to those skilled in the art from the following detailed description of the preferred embodiments, when read in light of the accompanying drawings.

DETAILED DESCRIPTION OF THE INVENTION

Figure 1:
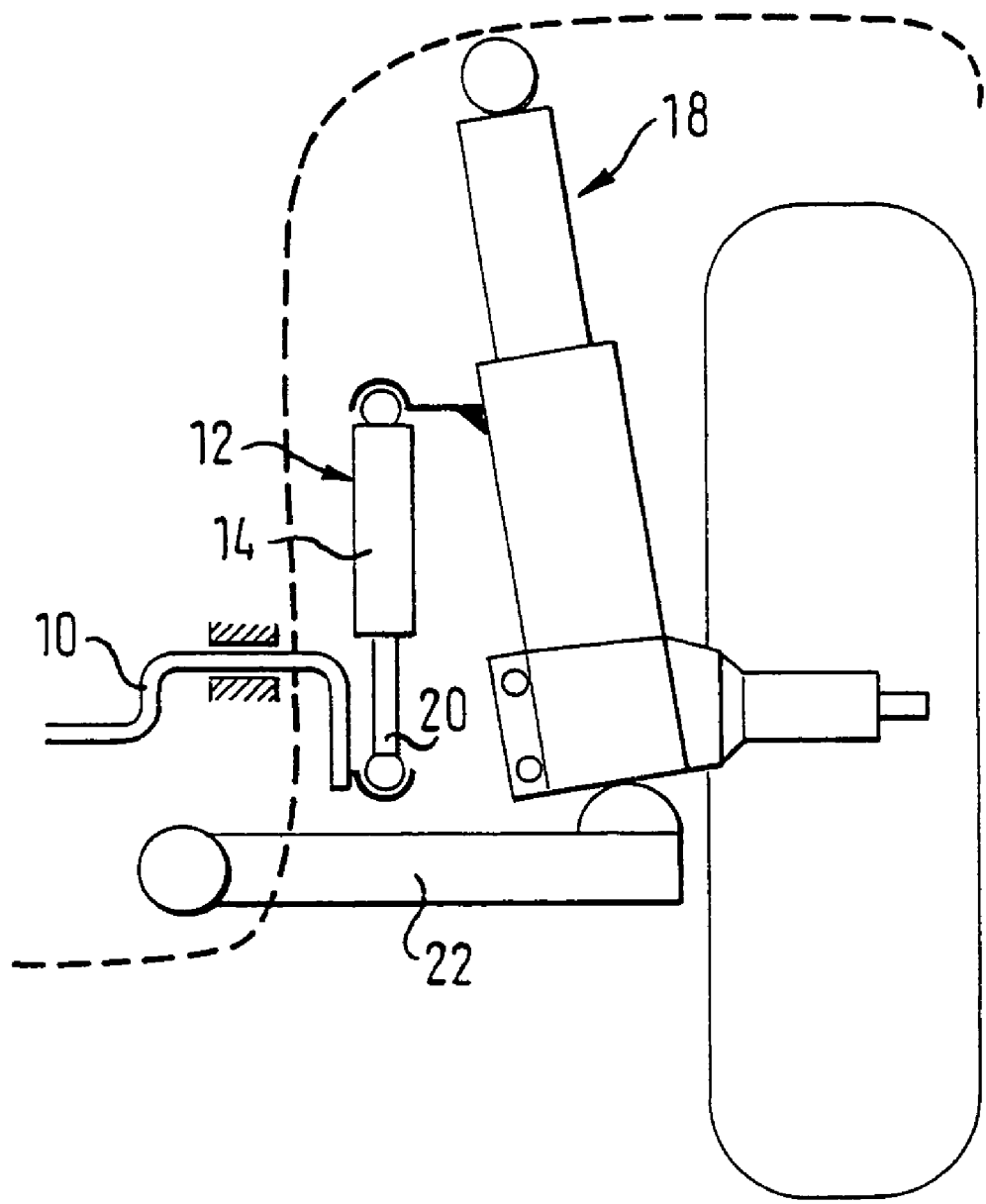
FIG. 1 shows a diagrammatic illustration of a system for rolling angle reduction according to the prior art.

The invention proceeds from a prior art system as shown in FIG. 1. A conventional wheel suspension in a vehicle comprises a spring strut 18, a transverse link 22 and a stabilizer 10. To reduce the rolling angle of the vehicle according to the prior art system of FIG. 1 one end of the stabilizer 10 is connected with the piston 20 of a piston/cylinder unit 12 with the cylinder 14 being coupled to the spring strut 18, so that the stabilizer 10 can be deflected vertically.

Figure 2:
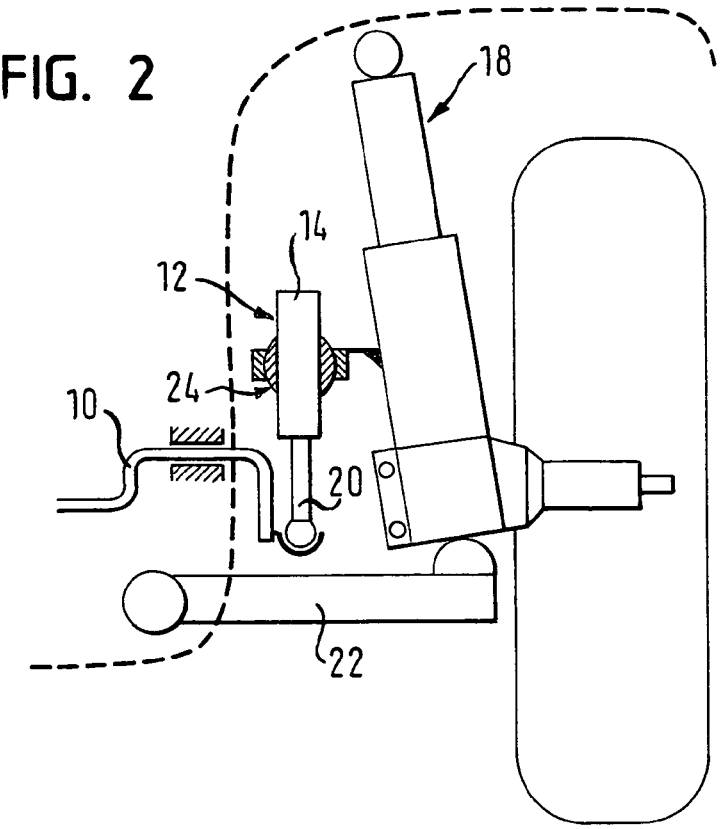
FIG. 2 shows a diagrammatic illustration of a system for rolling angle reduction according to a first embodiment of the invention.
Figure 3:
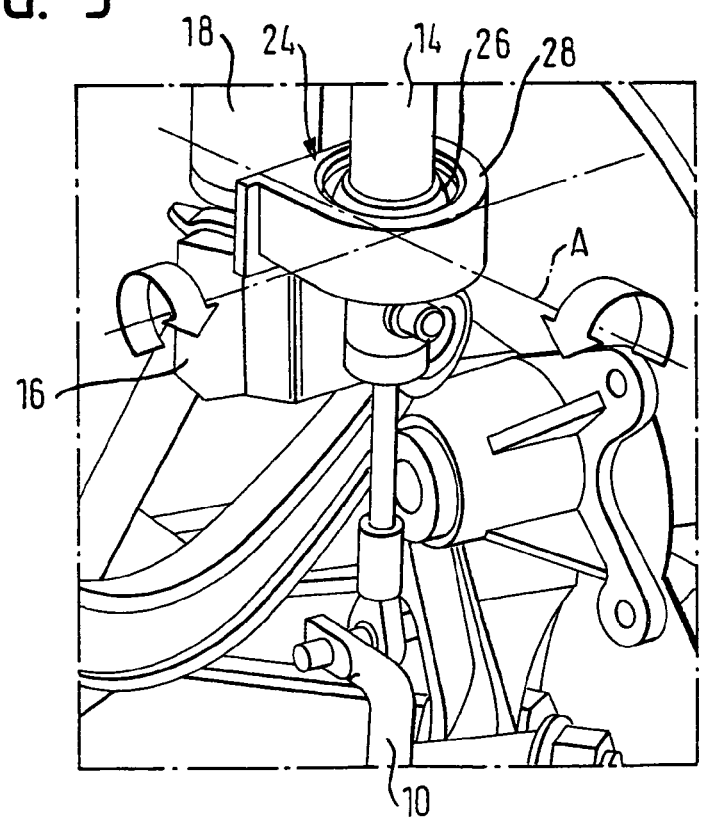
FIG. 3 shows a perspective view of the system of FIG. 2.

FIGS. 2 and 3 show a system according to the invention for rolling angle reduction. The components which coincide with the components shown in FIG. 1 are provided with the same reference numbers. In contrast to the conventional system described above, the cylinder 14 of the piston/cylinder unit 12 is not mounted on its end. The cylinder 14 is rather held in a hollow joint 24. As can be seen in FIG. 3, the cylinder 14 is surrounded in a central region by a hollow spherical body 26 connected securely with the cylinder 14. The body 26 is mounted in a joint housing 28 mounted on a fastening piece 16. In this embodiment the fastening piece 16 with the hollow joint 24 is arranged on the spring strut 18.

Figure 4:
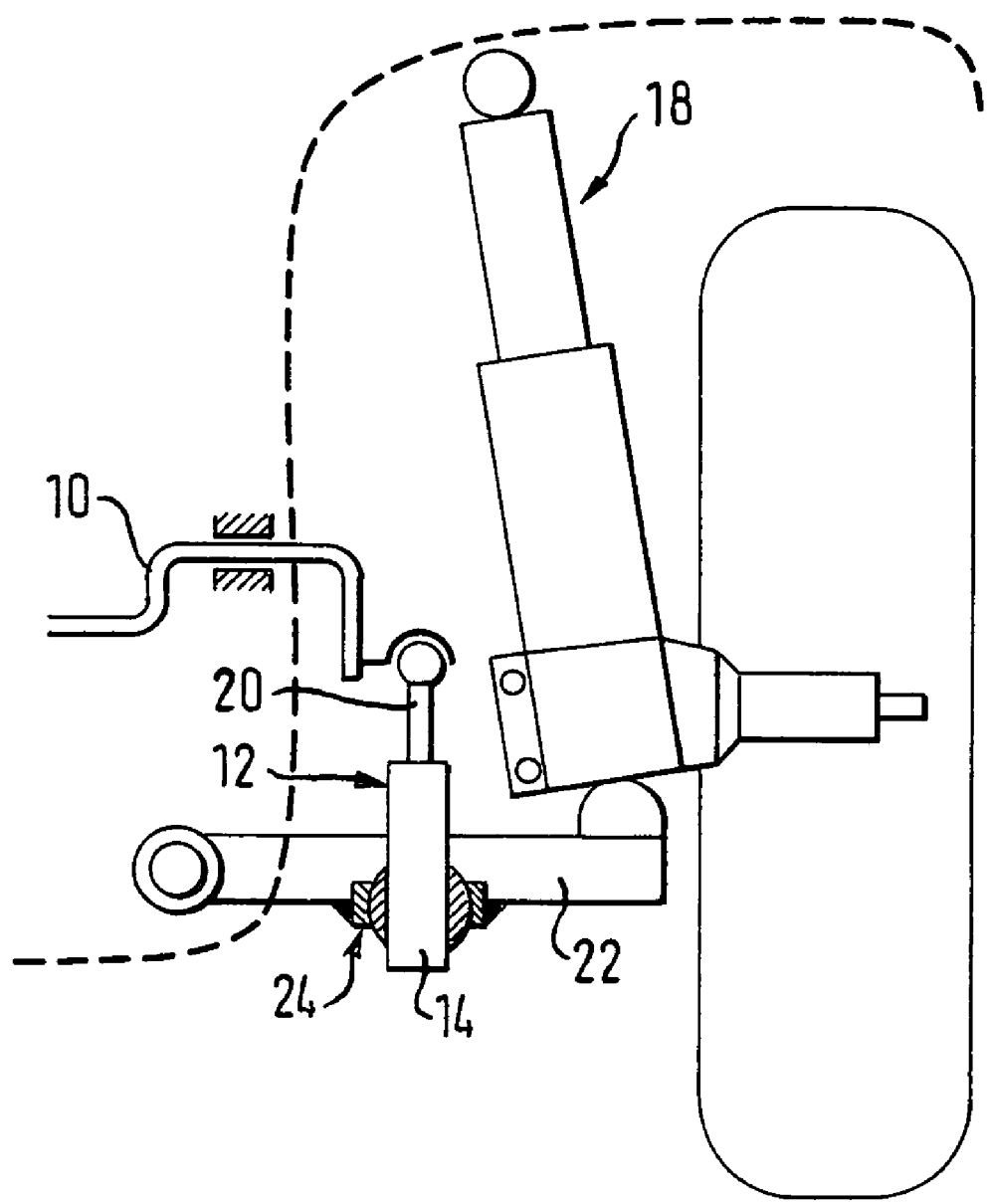
FIG. 4 shows a diagrammatic illustration of a system for rolling angle reduction according to a second embodiment of the invention.

According to an alternative embodiment shown in FIG. 4, the hollow joint 24 with the cylinder 14 held therein is arranged on the transverse steering arrangement 22. An installation on a wheel carrier of the vehicle is also possible (not shown).

Figure 4A:
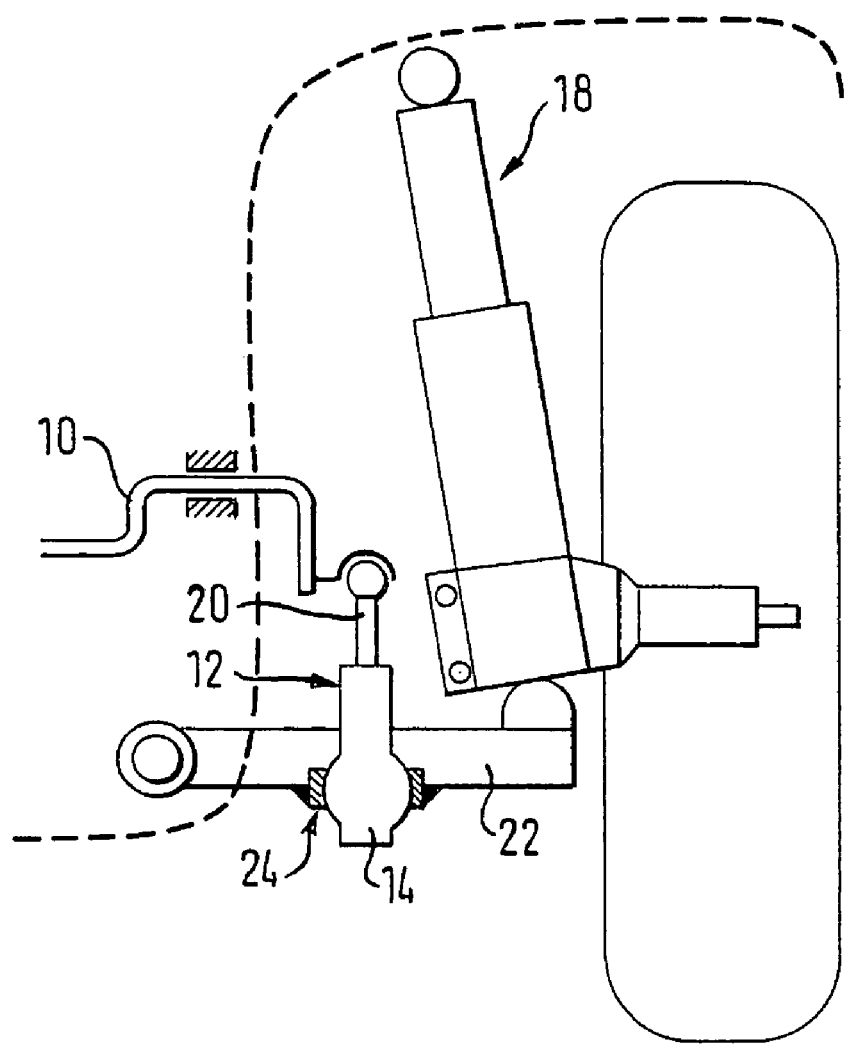
FIG. 4A shows a diagrammatic illustration of a system for rolling angle reduction according to an embodiment of the invention.

Basically, the hollow spherical body 26 can also be constructed in one piece with the cylinder 14 as shown in FIG. 4A.

Through the spherical joint bearing, the cylinder 14 can be swivelled in all directions, in particular also about a rotation axis A running in the longitudinal direction of the vehicle (see FIG. 3). A maximum swivel angle of approximately 40 degrees is possible. Such an angle is sufficient to compensate, free of transverse forces, all the relative movements occurring during travel.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A system for rolling angle reduction in a motor vehicle, the system comprising:
   a spring strut;
   a stabilizer;
   a piston/cylinder unit operatively disposed between the spring strut and the stabilizer, the piston/cylinder having a cylinder and a piston, the cylinder arranged on the spring strut, the piston connected to one end of the stabilizer, the piston/cylinder unit being operable to deflect the stabilizer in order to reduce the rolling angle of the vehicle; and a hollow joint arranged on the spring strut for holding the cylinder of the piston/cylinder unit therein, the hollow joint surrounding a central region of the cylinder for mounting the cylinder so that the cylinder is swivellable in several directions.

2. The system according to claim 1 wherein the hollow joint surrounds only the central region of the cylinder.

3. The system according to claim 1 wherein the hollow joint includes a hollow spherical body which is held in a ball joint housing.

4. The system according to claim 3 wherein the hollow spherical body is constructed in one piece with the cylinder.

5. The system according to claim 1 wherein the hollow joint is mounted in a fastening piece.

6. The system according to claim 1 wherein the piston/cylinder unit is hydraulically operated.

7. The system according to claim 1 wherein an end of the piston of the piston/cylinder unit is connected to one end of the stabilizer.

* * * * *